Figure 1:
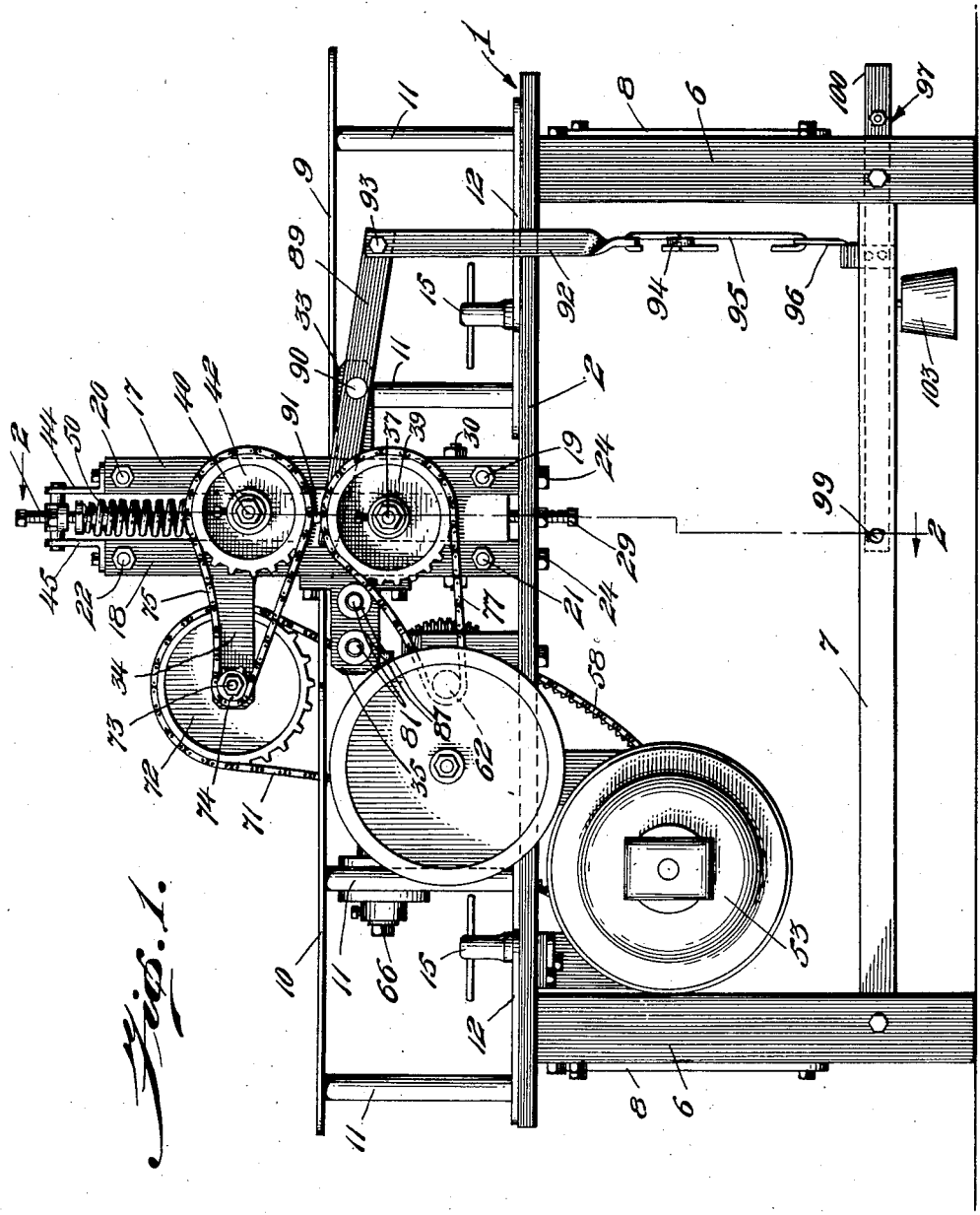

March 1, 1932.  W. H. PRUEFER  1,847,536
MACHINE FOR REMOVING SKINS FROM PORK STRIPS
Filed May 31, 1928   6 Sheets-Sheet 6

Inventor
Walter H. Pruefer
By Perley H. Plant
Attorney

Patented Mar. 1, 1932

1,847,536

UNITED STATES PATENT OFFICE

WALTER H. PRUEFER, OF WEST BARRINGTON, RHODE ISLAND

MACHINE FOR REMOVING SKINS FROM PORK STRIPS

Application filed May 31, 1928. Serial No. 282,028.

This invention relates to an improved derinding and skinning machine for removing the rind from smoked or cured bacon strips as well as the skin from fresh, unsmoked fat backs, jowls, pork bellies and the like.

One object of the present invention is to provide a device of this character which is capable of being easily constructed, simple in operation and highly efficient for the removal of the skin or rind from smoked or unsmoked pork strips without injury to the skin or rind and without wasting the meat by failure to completely separate the same from the skin or rind.

A further object of the invention is to provide a device of this character which is automatic in its operation, thus avoiding the careful manipulation of each pork strip to be treated by the operator, and the provision of transfer members or feed rolls adapted to engage a pork strip and positively feed the same to a cutting blade in such a manner as to insure the complete removal of the skin or rind free from adhering portions of the meat.

Another object of the invention is to provide improved means for uniformly and positively feeding the pork strips to the cutting blade, as well as an improved form of cutting blade and novel means for operating the same.

A further object of the invention is the provision of improved means for permitting one of the feed rolls to move vertically or tilt axially relative to the other feed roll whereby pork strips of varying thickness and irregular shape may be treated, as well as means for equalizing the pressure exerted upon different portions of the pork strips in its travel between the rolls.

Another object of the invention is to provide means for exerting tractive force upon the rind side of the pork strips to draw the same into engagement with the cutting blade for removing the rind or skin from the pork strip, whereby the more easily broken meat tissues are not subjected to such strain as would be liable to break or separate the same, and the provision of a rigid reciprocating cutting blade adapted to readily sever the skin or rind from the meat without such vibration as would cause the removal of a nonuniform rind section.

A further object of the invention is to provide means for removing a uniform strip or section of the skin or rind by providing a reciprocating cutting blade which extends parallel with and has all parts of its cutting edge spaced an equal distance from the adjacent surface of the lower feed roll.

Other objects of the invention relate to various improved details of construction and novel modes of operation including the various arrangements and combinations of the operating parts as will be more fully set forth in the detailed description to follow.

Various mechanisms have been proposed for removing the skin from fresh bellies, backs, and like pork strips, and some of these machines have been used to a considerable extent for the purpose. Although the difficulties involved in removing the skins from fresh unsmoked pork strips are considerably less than those which are encountered in removing the smoked rinds from smoked bacon strips, none of the machines heretofore employed have proved entirely satisfactory for the purpose of removing the skins from fresh unsmoked pork strips by reason of the tendency to cut away a portion of the meat with the skin or even leave patches of the skin adhering to the meat. The removal of the rind from smoked pork strips is much more difficult than the removal of the skin from unsmoked or fresh pork strips by reason of the unyielding nature of the rind and the difficulty in pressing the strip sufficiently to remove the wrinkles and other surface variations from the rind so that it may be entirely removed without cutting away portions of the meat. Considerable difficulty also attends the removal of skin from pork strips which have been frozen as well as in separating the rind from smoked pork strips, and so far as I am aware, none of the machines heretofore devised for the purpose have proved satisfactory in use.

So far as I am aware, none of the machines now in use are capable of properly removing the rinds from smoked pork strips and this fact appears to be so generally recognized in that it has been suggested that the skin be first removed from the fresh pork strips, and the strips then smoked after removal of the skins. This method of procedure is open to various objections, such as, that the flavor of the bacon and the appearance of the meat is better preserved if it is smoked before the rind is removed, and the removal of the skin before smoking causes a considerable shrinkage in the meat which entails a large loss to the processors.

The machine described herein has been found to be excellently adapted for removing the skin from fresh unsmoked pork strips as well as for cutting the rind from smoked pork strips of all kinds in such a manner as to remove the skin or rind completely and without cutting away the meat. In fact the skin or rind is removed as a thin sheet or section of substantially uniform thickness throughout and in such a manner as to permit use of the skin or rind as a leather substitute in the manufacture of certain types of shoes and similar articles.

Referring to the accompanying drawings:—

Figure 2:
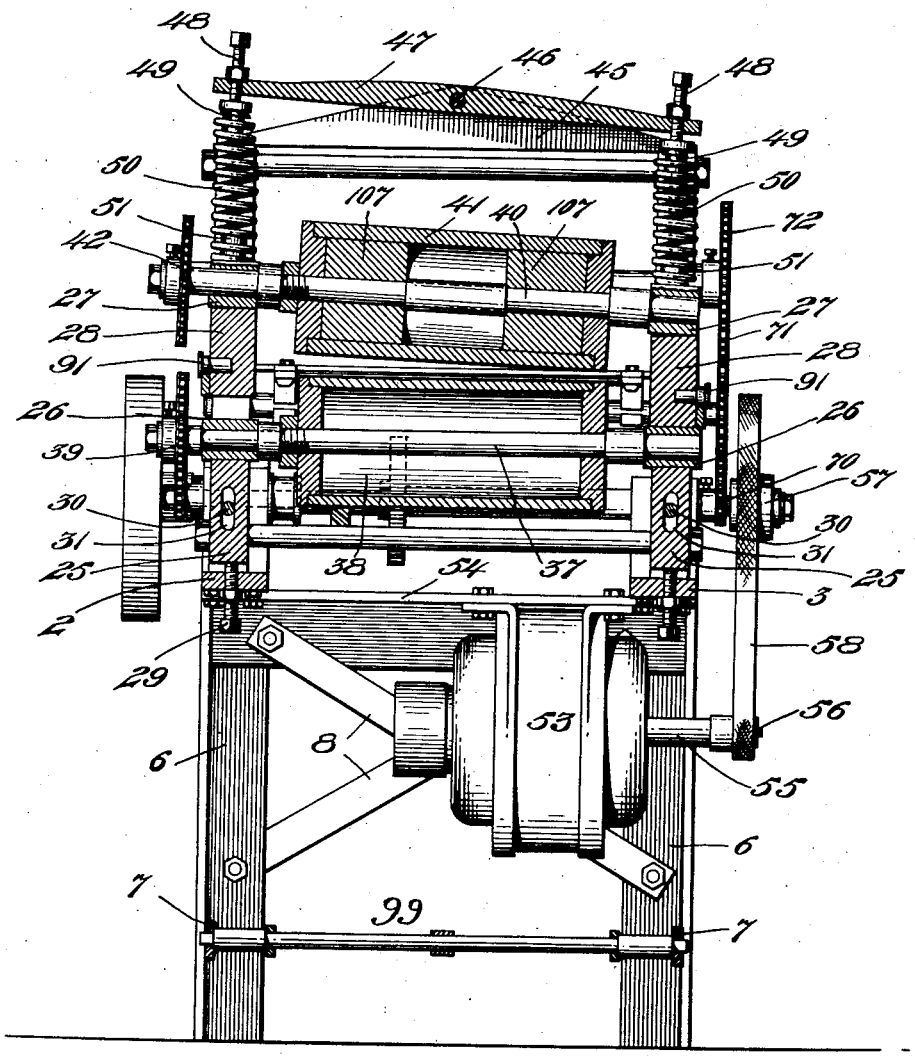
Figure 3:
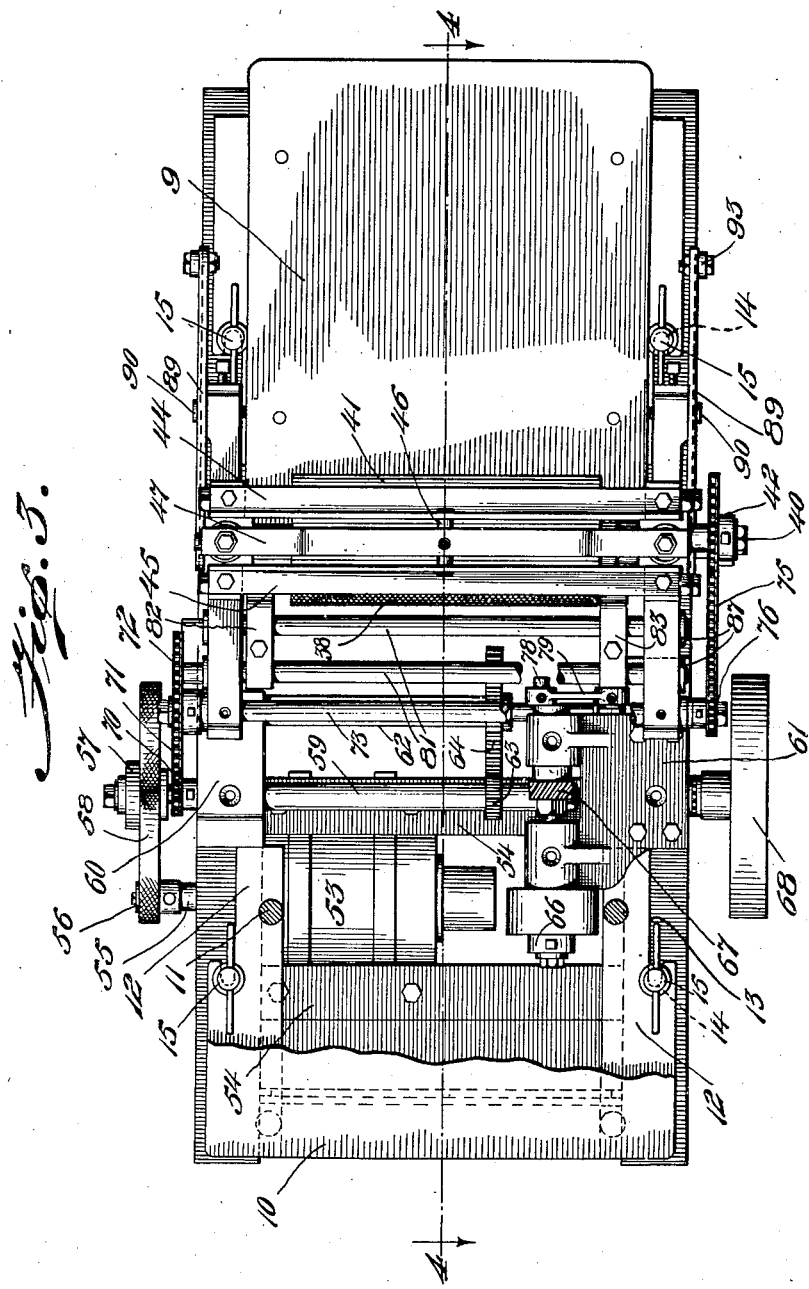
Figure 4:
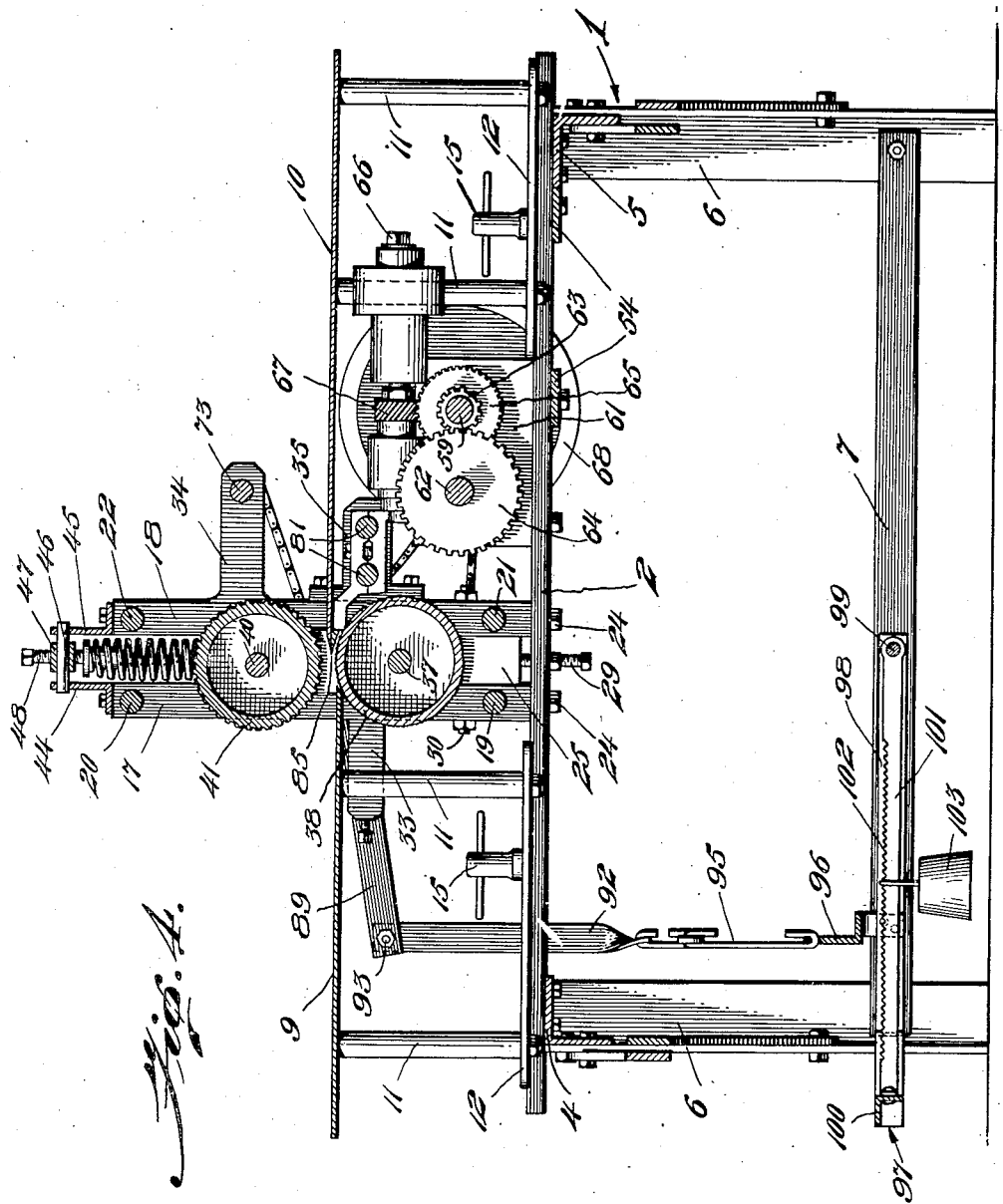
Figure 5:
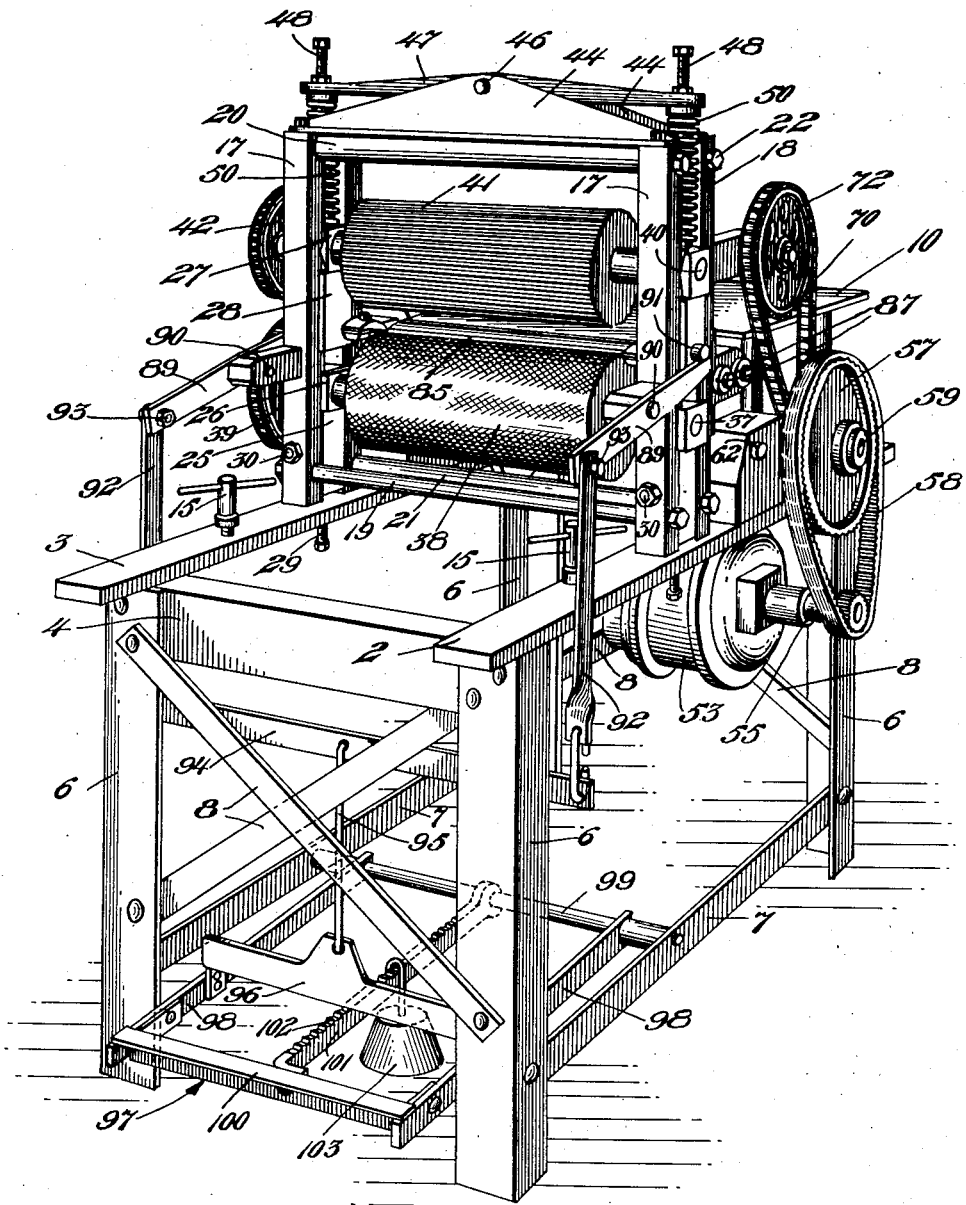
Figure 6:
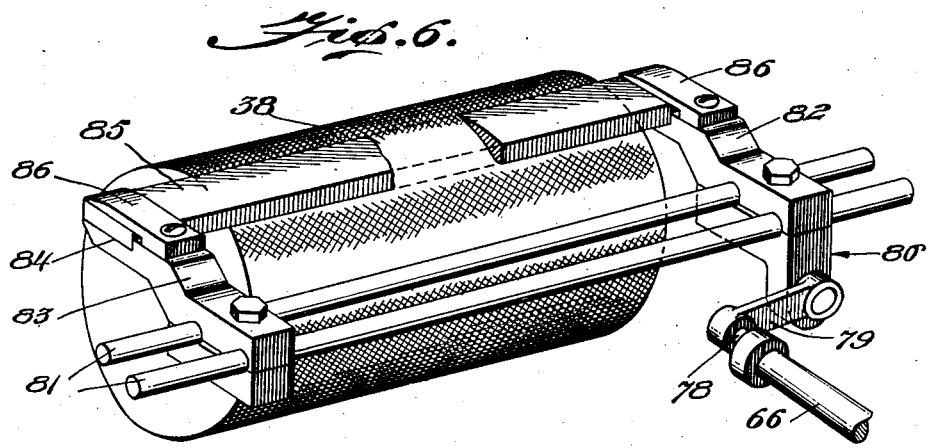
Figure 7:
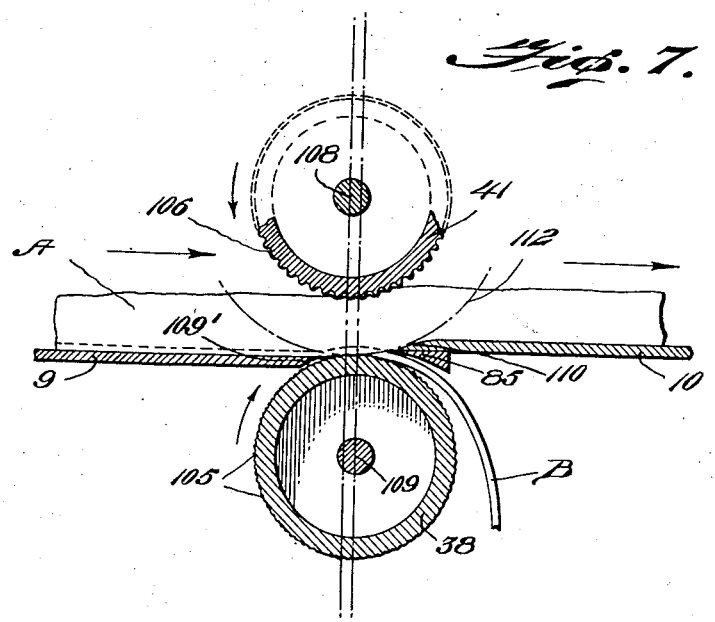

Fig. 1 is a side elevational view of my improved machine,

Fig. 2 is a vertical transverse sectional view, taken along the line 2—2 of Fig. 1, Fig. 3 is a top plan view of the machine with a portion of one of the tables broken away to better illustrate the position of the parts, Fig. 4 is a vertical, longitudinal sectional view, taken along the line 4—4 of Fig. 3, Fig. 5 is a perspective view of the machine, with one of the tables removed to show the position of the operating elements, Fig. 6 is a perspective view of the lower transfer member and cutting blade, showing their relative position when in use, and, Fig. 7 is a vertical sectional view taken through the transfer members and cutting blade and illustrating the operation of these parts and their position relative to each other in removing the rind from a strip of bacon.

In the embodiment of the invention illustrated herewith 1 designates generally a supporting frame formed of any suitable material, such as wood or metal, and which in the present embodiment of the invention is constructed mainly of metal strips so connected as to provide a firm and rigid supporting structure. The supporting frame comprises longitudinal supporting members 2 and 3 carried by transverse members 4 and 5, which are in turn supported by uprights 6 to which they are suitably secured by bolts or the like. The upright supports upon each side of the machine are preferably connected by longitudinal bars 7, and the corresponding end uprights are braced by diagonally arranged strips 8 connecting the uprights at each end of the machine with the corresponding transverse members 4 and 5. The supporting frame 1 as above described may be adapted to rest directly upon the floor of the room or may be mounted upon suitable casters or rolls (not shown) whereby it may be moved more readily from place to place as desired when in use.

The supporting frame may be formed conveniently by casting the uprights 6 at each end of the machine together with the corresponding transverse frame members in the form of a single end casting, thus simplifying the construction and rendering the assembly of the frame parts more ready of accomplishment, or the frame may be formed in any other suitable manner as may be found desirable in practice.

Removable tables 9 and 10 are carried by the supporting members 2 and 3, these tables being each provided with a plurality of supporting posts 11 connecting them with longitudinal base plates 12 which are adapted to rest when in use upon the longitudinal supporting members 2 and 3 where the tables are held in their operative positions upon the supporting frame. The longitudinal base plates 12 are adapted to seat upon the upper faces of the longitudinal supporting members 2 and 3 and each have a side portion cut away as at 13 to permit their insertion between set screws 15, and a groove 14 located at the end of the cut away portion is engaged by the reduced portion of each set screw 15 whereby each table may be arranged in a fixed and predetermined position on the supporting members 2 and 3 and locked in that position by means of the set screws 15. This construction also permits the ready removal of the tables to give access to the mechanism.

Mounted upon the longitudinal supporting members 2 and 3 are oppositely positioned transversely arranged guide members 17 and 18, the guide members 17 being rigidly secured together by bars 19 and 20, and the guide members 18 being similarly connected by bars 21 and 22. The oppositely positioned members 17 and 18 upon each side of the frame are rigidly secured to the longitudinal supporting members 2 and 3 as by bolts 24 and are spaced from each other to provide room for vertically movable adjusting blocks 25, bearing blocks 26 and 27, and spacing blocks 28 between each guide member 17 and its corresponding guide member 18.

The adjusting blocks 25 are each slidably mounted between oppositely positioned guide members 17 and 18, and are each capable of vertical adjustment by means of a set screw 29, carried by one of the longitudinal supporting members. A transverse bar 30 is passed through the opposite guide members 17 and 18 and each adjusting block 25 to hold the guide members firmly against movement relative to each other and to guide each adjusting block 25 in its vertical movement, the opening 31 formed in each adjusting block for the reception of the bar 30 being in the form of a slot in order to permit the necessary vertical movement of the adjusting block 25.

The guide members 17 and 18 may be formed by casting or in any other suitable manner, and an arm 33 may be secured to or cast integral with each guide member 17 for a purpose which will be more fully described hereinafter, and arms 34 and 35 may be cast integral with or secured to each guide member 18 for purposes which will more fully be described in connection with the parts supported thereby.

The adjusting blocks 25 are guided by the bars 30 in their vertical movement between the guide members 17 and 18, and the bearing blocks 26 and 27, and spacing blocks 28 may be provided with grooves for receiving the adjacent faces of the guide members to positively guide said blocks in their vertical movement.

A shaft 37 is rotatably supported by the opposite bearing blocks 26 and carries a roll or transfer member 38 fixedly secured thereto for rotation with said shaft. A sprocket wheel 39 is also carried by the shaft 37 for driving the roll 38. A shaft 40 is rotatably mounted in the bearing blocks 27 and carries a roll or transfer member 41 fixedly secured thereto and a sprocket wheel 42 for driving the roll 41.

The upper ends of the guide members 17 are connected by a plate 44, and a similar plate 45 connects the upper ends of the guide members 18. The plates 44 and 45 are connected to each other at a point substantially midway between the transversely opposed guide members by a pivot bolt 46 upon which is mounted a transversely extending rocker arm 47, capable of moving freely about the pivot bolt 46. An adjusting screw 48 is threaded in each end of the rocker arm 47 and provided with a seat 49 adapted to serve as a bearing for a coiled spring 50 located between corresponding guide members 17 and 18. The lower end of each spring 50 is adapted to seat upon one of the bearing blocks 27 and to be held against accidental displacement relative thereto by the boss 51. The coiled springs 50 engage the bearing blocks 27 to force the upper roll 41 downwardly towards the lower roll 38, and the force exerted by the coiled springs 50 may be varied by suitable movement of the adjusting screws 48.

A motor 53 is supported from transverse frame members 54 as shown and carries a shaft 55 provided with a sprocket wheel 56 connected to a sprocket wheel 57 by a sprocket chain 58. The sprocket wheel 57 is carried by a main drive shaft 59 which extends transversely of the frame and is rotatably mounted in bearing blocks 60 and 61 located adjacent to the opposite sides of the frame. The bearing blocks 60 and 61 are mounted upon the longitudinal frame members 3 and 2 respectively, and these bearing blocks also serve as bearings for the shaft 62 located forwardly of the shaft 59 and driven therefrom through the spur gears 63 and 64 carried by the shafts 59 and 62 respectively.

The drive shaft 59 is also provided with a worm gear 65 for driving the shaft 66 through the worm 67, and a fly-wheel 68 by which the mechanism may be driven from any convenient source of power instead of by the motor 53 when desired.

The main drive shaft 59 is also provided with a sprocket 70 connected by a sprocket chain 71 with a sprocket 72 carried by the shaft 73 which is rotatably supported by the arms 34 of the guide members 18. The opposite end of the shaft 73 is provided with a sprocket 74 which is connected with the sprocket 42 carried by the shaft 40 by a sprocket chain 75, for driving the upper roll or transfer member 41. The shaft 62 is also provided with a sprocket 76 which is connected with the sprocket 39 of the shaft 37 by a sprocket chain 77, for driving the lower roll or transfer member 38.

The shaft 66 is mounted in bearings carried by the bearing block 61 and extends longitudinally of the machine, being provided at the end nearest to the transfer members or rolls with a crank pin 78 to which is connected a crank arm 79, for connecting the same with a reciprocating frame 80. The reciprocating frame 80 comprises a pair of parallel spaced rods 81 to which are clamped spaced blade supporting members 82 and 83. The spaced blade supporting members are each provided with a recess 84 for the reception of one end of a rigid cutting blade 85, and a clamping member 86 for retaining the cutting blade in position upon the cutting blade supporting members. The spaced rods 81 are mounted for reciprocation in bearings 87 carried by the arms 35, which arms project outwardly from the guide members 18 and in position to locate the cutting blade 85 in proper position relative to the lower roll or transfer member 38.

The bearing blocks 60 and 61 may each be formed as integral castings provided with suitable bearings for the several shafts and capable of attachment to the frame in proper position for supporting the several shafts in operative relation with the other parts of the mechanism.

In order to provide means for raising the upper roll or transfer member 41 to facilitate the insertion of the end of a pork strip thereunder lever members 89 are pivoted to the arms 34 carried by the guide members 17 as at 90, one end of each of said lever members extending forwardly and engaging beneath a pin 91 carried by one of the spacing blocks 28 whereby the spacing blocks 28 and bearing blocks 27 may be raised against the pressure exerted by the coiled springs 50.

The opposite ends of the lever members 89 are pivoted to connecting arms 92 as at 93 which arms are in turn pivotally connected to the opposite ends of a rocker bar 94 which is connected by a central link 95 to a transverse bar 96 carried by a foot operated lever frame 97. The lever frame 97 comprises side members 98 secured at one end to a shaft 99 which is pivotally supported by the transverse frame members 7. The opposite ends of the side members 98 are connected by a transverse bar 100 which is adapted to be engaged by the foot of the operator for moving the lever frame 97 about the axis of the shaft 99. A bar 101 connects the shaft 99 and transverse bar 100 substantially midway between the side members 98, and the bar 101 is provided with notches 102 for holding a weight 103 in any one of a plurality of adjusted positions longitudinally of the bar 101.

In the operation of my improved machine the drive shaft 59 is rotated either by the motor 53, through the sprockets 56 and 57 and chain 58, or by a belt connecting the flywheel 68 with any suitable source of power. The drive shaft 59 drives the shaft 62 through the spur gears 64 and 65, and also drives the shaft 73 through the sprockets 70 and 72 and sprocket chain 71. The upper roll or transfer member 41 is rotated in clockwise direction, as seen in Fig. 1, from the shaft 73 through the sprockets 74 and 42 and the sprocket chain 75. The shaft 73 is so positioned as to permit a considerable degree of vertical or tilting movement on the part of the upper roll 41 without interfering with the drive of the shaft 40 and upper roll 41. The lower roll or transfer member 38 is rotated in counter-clockwise direction as seen in Fig. 1, from the shaft 62, through the sprockets 76 and 39 and the sprocket chain 77. The shaft 62 is so positioned as to permit such limited vertical movement of the shaft 37 and lower roll 38 as is necessary for the vertical adjustment of the lower roll through the adjusting blocks 25, without interfering with the driving of the shaft 37 from the shaft 62. The drive shaft 59 imparts relative movement to the shaft 66 through the intermeshing worm 67 and worm gear 65 whereby reciprocating movement is imparted to the cutting blade 85 through the crank arm 69. Rotation of the main drive shaft 59 results in the rotation of the transfer members 38 and 41, and at the same time reciprocates the cutting blade 85.

In the operation of the mechanism a pork strip, such as indicated by A in Fig. 7, is placed on the table 9 by the operator, and, on starting the machine, the operator places his foot on the transverse bar 100 thereby tilting the levers 89 about their pivots to raise the upper roll 41 against the pressure exerted by the springs 50 a distance sufficient to permit the edge of the pork strip to enter between the rolls or transfer members 38 and 41. As the strip is engaged by the rolls 38 and 41, it is drawn therebetween, in the direction of the arrows in Fig. 7, so that the reciprocating cutting blade 85 severs the rind or skin B close to the meat to entirely remove the skin or rind without cutting away any part of the meat therewith.

The lower roll or transfer member 38 is provided throughout all or a considerable part of its convex surface with a plurality of fine teeth 105 which may be formed by milling the surface of the roll or in any other suitable or desired manner, the teeth 105 being of sufficient length and sharpness to engage the skin or rind through the pressure exerted by the roll 41 and draw the pork strip forwardly against the reciprocating cutting blade. It is to be understood that the teeth located upon the surface of the feed roll 38 may extend to cover the entire surface thereof or such portions of the surface as may be found necessary or desirable for properly engaging the rind portion of the pork strips for exerting the necessary tractive force thereon, and the teeth or projections may be formed in any desired manner or may be of any desired shape as may be found best adapted for the purpose.

The upper roll or transfer member 41 is provided upon its surface with longitudinal ribs 106 which are preferably rounded so as to prevent breaking or cutting the tissues of the meat while forcing the strip against the lower roll 38 or the cutting blade. The position of the weight 103 may be varied on the bar 101 in accordance with the amount of pressure desired and that exerted by the coiled springs 50, and may be so positioned upon the bar 101 as to effect the desired degree of counter-balance for the coiled springs 50. In other words the weight 103 may be varied in amount and in its position on the bar 101 to overcome to any desired degree the pressure exerted by the coiled springs 50 in order to adapt the apparatus for use with different kinds or classes of pork strips so that the desired degree of pressure, and that only, will be exerted upon the pork strip by the upper roll 41.

The advisability of providing for such variations in pressure is due to the fact that in certain smoked or cured pork strips the rind is hard and unyielding and may contain wrinkles or inequalities which require considerable pressure to bring all portions of the rind into full and uniform contact with the lower roll 38 and thus insure proper severance of the rind by the cutting blade. In the case of green or fresh uncured pork strips, however, the skin is relatively soft and much less pressure is required to bring all portions of the skin into uniform contact with the surface of the lower roll 38 and thus insure proper removal of the skin by the cutting blade.

Moreover, the use of the weight 103 serves to partially counter-balance the pressure of the coiled springs 50 and requires less pressure to be exerted by the operator on the foot operated frame to raise the upper roll 41 for the insertion of the edge of the pork strip and thus makes the mechanism more easy to operate.

When the edge of the pork strip A has been inserted between the upper and lower rolls 41 and 38, the foot of the operator may be removed from the foot operated lever frame and the tractive force exerted by the rolls tends to draw the strip forwardly and against the cutting blade 85. Other pork strips may be placed immediately behind the one passing between the rolls and thus the operation may be made continuous without raising the upper roll upon the insertion of each strip.

It will be noted upon reference to Fig. 2 of the drawings that the upper roll 41 is not only capable of movement vertically relative to the lower roll 38, but that the upper roll 41 is also capable of axial tilting to accommodate itself to pork strips of uneven thickness, while the rocker arm 47 moves freely about its pivot 46 to equalize the pressure exerted by the coiled springs 50 on the upper roll, thereby insuring that substantially equal pressure be exerted upon all parts of each pork strip. The upper roll 41 is shown as provided with weights 107 located adjacent to its opposite ends for supplementing the pressure exerted by the springs 50 when necessary. It is to be understood however, that these weights 107 may be increased or decreased as desired or they may be entirely omitted and tension upon the coiled springs 50 increased if desired by varying the adjusting screw 48 to compensate for the elimination of the weights 107.

It will be seen upon reference to Fig. 7 of the drawings that the center 108 of the upper roll 41 is off-set slightly to the left, as shown in that figure, from the center 109 of the lower roll 38, which results in subjecting the pork strip A to greatest pressure slightly in advance of the vertical center line passing through the center of the lower roll 38, thus causing the teeth 105 on the lower roll 38 to engage the rind B so as to positively draw the rind forward and bring the strip A into proper engagement with the cutting blade 85. The cutting blade 85 and beveled edge 110, of the table 10 are so positioned as to be arranged at approximately the same distance from the center 108 of the roll 41 as the nearest point on the roll 38, as indicated by the arc 112 struck from the point 108 as a center. This arrangement of the parts also tends to eliminate completely any wrinkles in the skin or rind immediately in advance of the cutting blade and thus insure complete removal of the rind or skin by the cutting blade without cutting away any portion of the meat, the rigid cutting blade 85 being arranged with its cutting edge parallel with and properly spaced from the surface of the roll 38 for this purpose. The teeth 105 on the roll 38, as stated, are made of sufficient length and sharpness to engage the rind or skin, when pressed thereagainst by the upper roll 41, sufficiently to positively draw the pork strips A forwardly but the teeth 105 are preferably not of sufficient length to extend through the skin or rind or to project therein to such an extent as to destroy the value of the rind for those purposes for which it may be used.

The edge of the table 9 located adjacent to the lower roll or transfer member 38 is beveled slightly as at 109'; so that the table 9 is brought into close proximity with the surface of the roll 38, and the surface of the table 9 is located slightly lower than the surface of the table 10 and substantially tangential to the surface of the roll 38.

The forward edge of the table 10 is also beveled slightly at 110, as stated, in order to permit the ready separation of the meat from the skin or rind as the cutting blade 85 is reciprocated and to allow the meat to slide unobstructedly upon the table 10. It will be seen from reference to Figs. 6 and 7 of the drawings that the cutting blade 85 is of rigid construction and is supported by its frame in position to be reciprocated by the shaft 66 with its edge in properly spaced relation to the surface of the lower roll 38 and directly beneath the beveled edge 110 of the table 10. The adjusting blocks 25 are capable of adjustment through the set screws 29 whereby the space between the surface of the lower roll 38 and the edge of the cutting blade 85 may be adjusted in accordance with the thickness of the rind to be removed.

It will be seen that by providing the lower roll or transfer member 38 with a toothed surface for engaging the rind of the pork strips and providing pressure means for forcing the upper roll or transfer member against the pork strip a considerable degree of tractive force may be exerted upon the pork strip by the lower roll, which force is exerted mainly upon the rind or skin portion and therefore injury to the meat is avoided. The rocker arm 47 by equalizing the pressure exerted by the coil springs 50 results in substantially uniform pressure being exerted throughout the entire width of the pork strip even when the strip varies in thickness, and the axial tilting of the upper roll 41 enables it to maintain contact with and exert substantially uniform pressure upon all parts of the pork strips lying between the adjacent portions of the surfaces of the rolls.

The provision of a rigid reciprocating cutting blade arranged parallel with and having its cutting edge spaced an equal distance from the surface of the roll results in the severance of the skin or rind in a uniform manner and without removing therewith any portion of the meat, and by providing means for adjusting the lower roll 38 vertically, the thickness of the skin or rind removed may be regulated as desired dependent upon the condition of the lot of pork strips to be treated.

While the lower roll 38 is capable of limited adjustment by means of the set screws 29 in order to better adapt the same for use with different lots of pork strips in which the thickness of the rind may vary slightly and in order to permit the individual user to adjust the same in accordance with his particular wishes as to the thickness of the rind section which he desires to remove, the lower roll may be and is referred to as fixed in the sense that it is not intended for rapid adjustment while in use but is intended to operate continuously in a certain adjusted position after having been set up in the adjusted postion for removing a rind section of a desired thickness.

By utilizing a lower feed roll provided upon its surface with a plurality of short teeth of sufficient sharpness to penetrate into the rind enough to exert considerable tractive force for drawing the pork strip forwardly against the cutting blade, but not of sufficient length to pass entirely through the rind, the rind side of the pork strip is forced against the cutting blade and the liability of the meat to bank up in front of the knife, which is present in certain machines now employed, is entirely obviated. The use of a rigid reciprocating cutting blade instead of a stationary cutter or a band blade tends also to facilitate the passage of the blade through the meat to effect proper and efficient cutting, and by spacing the reciprocating cutting blade a uniform distance from the surface of the roll the removal of a uniform rind section is insured and the necessity of further hand trimming is obviated.

The present machine is not only capable of use for removing the skin from unsmoked fresh pork strips but is also capable of completely removing the rind from smoked pork strips in a uniform manner so as to entirely avoid the necessity for any hand trimming, and when operated at capacity will do approximately ten times as much work as any machine now in use for the purpose.

In the removal of the skin or rind from smoked or unsmoked pork strips by my improved mechanism I make use of an improved method of operation to effect the complete separation of a uniform skin or rind section free from any adhering portions of the meat by exerting sufficient pressure upon the upper feed roll 41 through the coiled springs 50 to substantially press out any wrinkles or inequalities in the skin or rind as the same is pressed against the toothed surface of the lower feed roll 38. This pressure is uniformly applied to all portions of the strip regardless of its thickness through the axial tilting of the upper roll 41, and as a result of this pressure all parts of the skin side of the strip are uniformly engaged by the surface teeth 105 of the lower roll 38 throughout the width of the strip. It follows that upon rotation of the lower roll 38 all parts of the skin side of the strip are advanced at equal speeds towards the cutting edge, and by exerting the tractive force mainly on the skin side of the strips any bunching up or doubling up of the meat in front of the cutting edge is prevented.

By positioning the reciprocating cutting blade parallel with and spaced only a slight distance from the line of the maximum pressure on the lower roll 38 the pork strip passes into engagement with the cutting edge without wrinkles or other inequalities present in the skin, and by reciprocating the cutting blade in a path substantially parallel with the axis of the lower roll 38, a thin and uniform skin section is removed from the pork strip to completely separate the skin from the meat without waste of the meat.

While I have shown the frame portion of the machine as formed generally from metal strips bolted or otherwise secured together it is to be understood that the certain groups of associated frame elements may be and preferably are formed by being cast together as integral castings in order to simplify the assembly, and such modifications and changes in the manner of constructing the frame and shaft supports are understood to be within the scope and intent of my invention which is not to be limited to the particular form and arrangements of the frame and supporting elements as shown, or any of them, except as the same may be specifically set forth in the appended claims.

It is to be understood, also, that various changes may be made in the construction and arrangements of the operating mechanisms, and means for transmitting power to and actuating the various elements without departing from the spirit and scope of my invention as set forth in the appended claims, and that the claims are to be broadly construed in the light of my disclosure herein, which disclosure is to be regarded as illustrative of my invention rather than as limiting the same to the precise elements and combinations of elements as shown.

What I claim is:—

1. In a machine of the character described, a reciprocating cutting blade, a feed roll located upon one side of said cutting blade and rotatably mounted in bearings which are normally fixed relative to said cutting blade, a feed roll adapted to cooperate with said first named feed roll and located upon the opposite side of said cutting blade relative to said first named feed roll, movable bearings supporting said second named feed roll, resilient means for forcing said movable bearings towards said cutting blade, an equalizing member engaging said resilient means for automatically equalizing the pressure upon the movable bearings, means for rotating said feed rolls, and means for reciprocating said cutting blade.

2. In a machine of the character described, upper and lower cooperating feed rolls, a reciprocating cutting blade located parallel to and in spaced relation to said lower feed roll, vertically movable bearings for supporting said upper feed roll, a pivoted equalizing arm supported intermediate said movable bearings, spring members interposed between portions of said equalizing arm and said movable bearings, means for rotating said feed rolls, and means for reciprocating said cutting blade.

3. In a machine of the character described, a cutting blade, upper and lower rotatable feed rolls adapted to feed material to said cutting blade, means for exerting constant pressure upon said upper feed roll to force the same towards said lower feed roll, and adjustable means for counter-balancing the pressure exerted by said upper feed roll upon said lower feed roll.

4. In a machine of the character described, upper and lower feed rolls, the lower of said feed rolls being provided with surface teeth, pressure means for forcing the ends of said upper feed roll towards said lower feed roll, means for counter-balancing the pressure exerted upon the ends of said upper feed roll, a rigid reciprocating cutting blade having its cutting edge located in substantial parallelism with and spaced from the surface of said lower feed roll, means for rotating said feed rolls, and means for reciprocating said cutting blade in a direction parallel with the axis of said lower feed roll.

In testimony whereof I have affixed my signature.

WALTER H. PRUEFER.